Aug. 15, 1961     D. W. F. JANZ     2,996,689

CONSTANT D.-C. RESISTANCE FREQUENCY VARIABLE T-T NOTCH NETWORK

Filed May 24, 1960

*INVENTOR.*
DONALD W. F. JANZ

United States Patent Office 2,996,689
Patented Aug. 15, 1961

2,996,689
CONSTANT D.-C. RESISTANCE FREQUENCY VARIABLE T-T NOTCH NETWORK
Donald W. F. Janz, Haddonfield, N.J., assignor, by mesne assignments, to the United States of America as represented by the Secretary of the Navy
Filed May 24, 1960, Ser. No. 31,503
6 Claims. (Cl. 333—75)

The present invention relates to filter networks such as may be employed, for example, in servomechanisms where it is desired to bring two rotatable members into positional alignment, or in direct-current amplifiers where locally-developed oscillations may occur within a relatively narrow frequency range.

It is frequently desirable to utilize one or more filter circuits in connection with servomechanisms or other motor control arrangements to attenuate undesired voltages which would otherwise adversely affect motor operation. Such voltages can be generated, for example, as a result of an oscillation of the electromechanical servo assembly at its natural or resonant frequency. Where the servomechanism forms part of an antenna-positioning system for search or tracking radars, the presence of such spurious oscillations can cause the antenna to correspondingly oscillate or wobble. This materially reduces the effectiveness of the system by altering the antenna scanning pattern so that the field of search may not be fully covered.

The above conditions are not overcome without some difficulty, since, if the amplifier contains direct-coupled stages, then any variation of input-to-output resistance of an adjustable-frequency filter network will be adverse to satisfactory operation.

Such filter networks are consequently unsuitable for use in systems of the type under discussion, since the period of the spurious energy to be rejected can change somewhat due to variations in ambient temperature of the servo apparatus as well as because of normal manufacturing tolerances when replacement of any component of the system is required. Since the frequency of this unwanted energy is not constant, it cannot accurately be predetermined, and hence any filter network selected will yield a D.-C. output which is determined by the oscillation frequency at any given instant of time unless the circuit is designed to compensate for variations thereof. It will be readily appreciated that changes in D.-C. output of the filter network as a result of variations in the frequency of any spurious oscillations which may be present cannot be tolerated, especially when the network forms part of a servo system, since in such a case the D.-C. output determines the position of the servo motor shaft, and any departure of this output voltage from its proper value results in a misalignment of the motor shaft and detracts from optimum operation of the mechanism as a whole.

Although the above conditions have been recognized, attempts to achieve a satisfactory solution have involved complex circuit arrangements which were subject to both electrical and mechanical drawbacks. According to a principal feature of the present invention, these disadvantages are overcome, and a filter network provided which is both simple in construction and reliable in operation, this network at the same time being readily adjustable to the particular frequency possessed by that energy the attenuation of which is desired.

One object of the present invention, therefore, is to provide an improved type of electrical filter.

Another object of the invention is to provide an improved filter network which has a constant D.-C. input-to-output resistance factor.

A further object of the invention is to provide a filter network for D.-C. amplifiers and the like which is designed to reject unwanted A.-C. energy, the D.-C. output of the filter being substantially unchanged when the filter is adjusted to compensate for variations in the frequency of such A.-C. energy.

An additional object of the invention is to provide an improved constant D.-C. resistance "notch" filter of the twin-type in which the capacitance values of the filter remain fixed during any adjustment of its frequency-rejection characteristics.

Other objects and many of the attendant advantages of this invention will be readily appreciated as the same becomes better understood by reference to the following detailed description when considered in connection with the accompanying drawings wherein.

Figure 1:
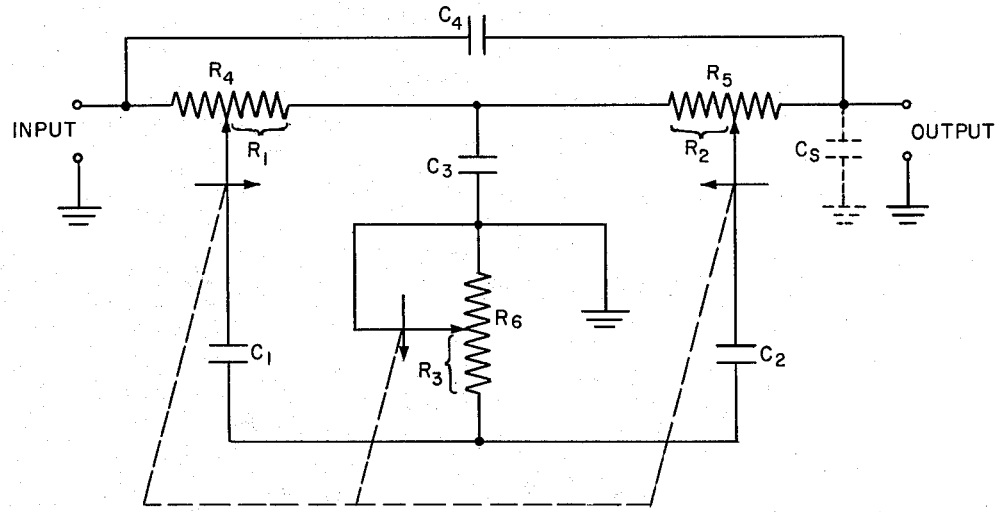
FIG. 1 is a circuit diagram of an electrical filter network designed in accordance with a preferred embodiment of the present invention.

Referring first to FIG. 1 of the drawings, there is illustrated a filter network of the twin-type, consisting of a pair of resistance elements $R_4$ and $R_5$ connected in series between the input and output terminals of the network, as shown. Each of the members $R_4$ and $R_5$ constitutes the resistance element of a potentiometer having a movable contact effectively dividing the resistance element into two portions $R_1$, $R_4$—$R_1$ and $R_2$, $R_5$—$R_2$, respectively, as set forth in the drawing. The movable, or wiper, contacts of the two potentiometers are ganged to concurrently move when manually actuated in the direction of the arrows, for reasons which will become apparent as this description proceeds.

A pair of equivalent capacitors, each designated by the reference character C in the drawings, are respectively connected between the wiper contacts of potentiometers $R_4$ and $R_5$ and one terminal of the resistance element of a further potentiometer $R_6$. The other resistance terminal of $R_6$ is grounded, and also connected through a further capacitor $C_3$ to the lead joining the series-connected potentiometers $R_4$ and $R_5$. The wiper contact of potentiometers $R_6$ is grounded in order to permit a variation in the degree of attenuation of the spurious energy, as will be later discussed. The capacitor $C_s$, shown in broken lines, is not a physical component, but represents the stray capacitance of the network. The effect of this stray capacitance is to introduce high-frequency instability under certain conditions of operation, and hence a capacitor $C_4$, bridging the potentiometers $R_4$ and $R_5$, may advantageously be employed to compensate for this factor when the filter network of FIG. 1 is utilized, for example, in conjunction with a high-gain feedback amplifier.

The wiper contact of potentiometer $R_6$ may or may not be ganged to the wiper contacts of both potentiometers $R_4$ and $R_5$. In the following description, it will be assumed that all three of these contacts are interconnected to concurrently move in the respective directions shown by the arrows in the drawing. Wiper contact of potentiometer $R_6$ effectively divides the resistance element of this component into two portions $R_3$ and $R_6$—$R_3$, in a manner similar to that described for the components $R_4$ and $R_5$.

It is a feature of the filter network of FIG. 1 that attenuation of A.-C. energy may be brought about by manual adjustment of the circuit parameters, even though the frequency of this energy varies within a limited range, while at the same time maintaining a constant D.-C. resistance through the network and without in any way altering its capacitance values. To achieve this objective, it is necessary to satisfy the following equations:

$$R_1 R_2 = \frac{C_1 + C_2}{\omega_0^2 C_1 C_2 C_3} \quad (1)$$

and $$R_3 = \frac{1}{(R_1 + R_2)\omega_0^2 C_1 C_2} \quad (2)$$

where $\omega$ is the angular frequency.

Figure 2:
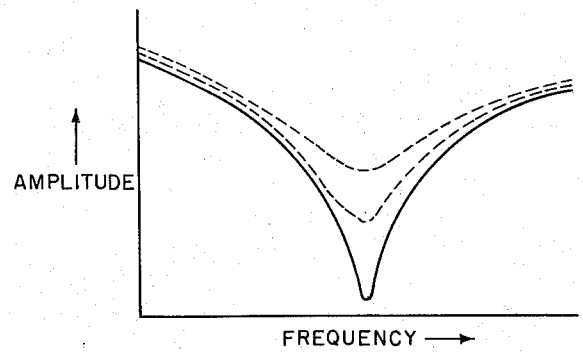
FIG. 2 is a graph of representative amplitude vs. frequency characteristics of the filter network of FIG. 1.

The equality of Expressions 1 and 2 will be proven hereinafter. Obviously, since $R_4$ and $R_5$ do not vary, the total D.-C. input-output resistance of the network is constant. Furthermore, the value of each of the two capacitors C is a fixed quantity. It will be noted that manual adjustment of the ganged potentiometers $R_4$ and $R_5$ shifts the "notch" frequency, and the solid-line curve of FIG. 2 represents one manner in which attenuation of unwanted energy may occur at a selected position. The degree of such energy attenuation is determined by the setting of potentiometer $R_6$, or, in other words, the value of $R_3$ is controlling insofar as amplitude is concerned, and variations thereof can reduce the amount of signal rejection in the manner illustrated by the exemplary broken-line curves of FIG. 2. While the ratio of $R_1$ and $R_2$ is not significant, nevertheless, if $R_6$ is ganged to either or both $R_4$ and $R_5$, then the ratio between $R_3$ and either or both $R_1$ and $R_2$ is critical for a maximum null at the "notch" frequency.

Figure 3:
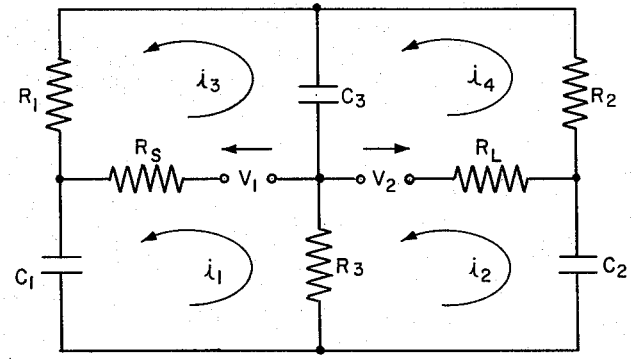
FIG. 3 is a schematic electrical equivalent of the filter network of FIG. 1 which is useful in explaining the theory of operation of this preferred embodiment of the present invention.

It has been stated above that the equations $$R_1 R_2 + \frac{C_1 + C_2}{\omega_0^2 C_1 C_2 C_3} \quad (1)$$

and $$R_3 = \frac{1}{C_1 C_2 (R_1 + R_2)\omega_0^2} \quad (2)$$

should be satisfied in order to yield the results described. To demonstrate the manner in which these equalities are established, the following analysis is given in connection with the showing of FIG. 3 of the drawings, which is a schematic diagram equivalent electrically to the circuit illustrated in FIG. 1. It will be noted that in FIG. 3 the impedance $R_s$ is equal to the impedance $R_4 - R_1$ in FIG. 1, and the impedance $R_L$ is equal to $R_5 - R_2$. Consequently, $$V_1 = i_1\left(R_s + R_3 - j\frac{1}{\omega C_1}\right) + i_2(-R_3) + i_3(-R_s) + 0$$

$$V_1 = i_1(R_s) + 0 + i_3\left(-R_s - R_1 + j\frac{1}{\omega C_3}\right) + i_4\left(-j\frac{1}{\omega C_3}\right)$$

$$V_2 = i_1(R_3) + i_2\left(-R_3 - R_L + j\frac{1}{\omega C_2}\right) + 0 + i_4(R_L)$$

and $$V_2 = 0 + i_2(-R_1) + i_3\left(j\frac{1}{\omega C_3}\right) + i_4\left(R_L + R_2 - j\frac{1}{\omega C_3}\right)$$

On the null frequency ($\omega_0$)

$$i_2 = i_4$$

and $$V_2 = 0$$

Then, if $$i_2 = \frac{N_2}{D}$$

and $$i_4 = \frac{N_4}{D}$$

it follows that $$\frac{N_2}{D} = \frac{N_4}{D}$$

or $$N_2 - N_4 = 0$$

Now $$N_2 = \begin{vmatrix} \left(R_s + R_3 - j\frac{1}{\omega_0 C_1}\right) & V_1 & (-R_s) & 0 \\ (R_s) & V_1 & \left(-R_s - R_1 + j\frac{1}{\omega_0 C_3}\right) & \left(-j\frac{1}{\omega_0 C_3}\right) \\ (R_3) & 0 & 0 & (R_L) \\ 0 & 0 & \left(j\frac{1}{\omega_0 C_3}\right) & \left(R_L + R_2 - j\frac{1}{\omega_0 C_3}\right) \end{vmatrix}$$

and $$N_4 = \begin{vmatrix} \left(R_s + R_3 - j\frac{1}{\omega_0 C_1}\right) & (-R_3) & (-R_s) & V_1 \\ (R_s) & 0 & \left(-R_s - R_1 + j\frac{1}{\omega_0 C_3}\right) & V_1 \\ (R_3) & \left(-R_3 - R_L + j\frac{1}{\omega_0 C_2}\right) & 0 & 0 \\ 0 & (-R_L) & \left(j\frac{1}{\omega_0 C_3}\right) & 0 \end{vmatrix}$$

Letting $$A = \left(R_s + R_3 - j\frac{1}{\omega_0 C_3}\right)$$

$$B = (R_s)$$

$$C = (R_3)$$

$$D = 0$$

$$E = (-R_3)$$

$$F = 0$$

$$G = \left(-R_3 - R_L + j\frac{1}{\omega_0 C_2}\right)$$

$$H = (-R_L)$$

$$I = (-R_s)$$

$$J = \left(-R_s - R_1 + j\frac{1}{\omega_0 C_3}\right)$$

$$K = 0$$

$$L = \left(j\frac{1}{\omega_0 C_3}\right)$$

$$M = 0$$

$$N = \left(-j\frac{1}{\omega_0 C_3}\right)$$

$$O = (R_L)$$

$$P = \left(R_L + R_2 - j\frac{1}{\omega_0 C_3}\right)$$

$$W = V_1$$

$$X = V_1$$

$$Y = 0$$

$$Z = 0$$

then $$N_2 - N_4 = \begin{vmatrix} A & W & I & M \\ B & X & J & N \\ C & Y & K & O \\ D & Z & L & P \end{vmatrix} - \begin{vmatrix} A & E & I & W \\ B & F & J & X \\ C & G & K & Y \\ D & H & L & Z \end{vmatrix} = 0$$

and $$N_2 - N_4 = \begin{vmatrix} A & W & I & M \\ B & X & J & N \\ C & Y & K & O \\ D & Z & L & P \end{vmatrix} + \begin{vmatrix} A & W & I & E \\ B & X & J & F \\ C & Y & K & G \\ D & Z & L & H \end{vmatrix} = \begin{vmatrix} A & W & I & (M+E) \\ B & X & J & (N+F) \\ C & Y & K & (O+G) \\ D & Z & L & (P+H) \end{vmatrix} = 0$$

or, expressed differently, $$A\begin{vmatrix} XJ(N+F) \\ YK(O+G) \\ XL(P+H) \end{vmatrix} - W\begin{vmatrix} BJ(N+F) \\ CK(O+G) \\ DL)P+H) \end{vmatrix} + I\begin{vmatrix} BX(N+F) \\ CY(O+G) \\ DZ(P+H) \end{vmatrix} - (M+E)\begin{vmatrix} BXJ \\ CYK \\ DZL \end{vmatrix} = 0$$

Substituting, $$\left(R_s + R_3 - j\frac{1}{\omega_0 C_1}\right)\begin{vmatrix} V_1 & \left(-R_s - R_1 + j\frac{1}{\omega_0 C_3}\right) & \left(-j\frac{1}{\omega_0 C_3}\right) \\ 0 & 0 & \left(-R_3 + j\frac{1}{\omega_0 C_2}\right) \\ 0 & \left(j\frac{1}{\omega_0 C_3}\right) & \left(R_2 - j\frac{1}{\omega_0 C_3}\right) \end{vmatrix} +$$

$$-V_1 \begin{vmatrix} R_s & \left(-R_s - R_1 + j\frac{1}{\omega_0 C_3}\right) & \left(-j\frac{1}{\omega_0 C_3}\right) \\ R_3 & 0 & \left(-R_3 + j\frac{1}{\omega_0 C_2}\right) \\ 0 & \left(j\frac{1}{\omega_0 C_3}\right) & \left(R_2 - j\frac{1}{\omega_0 C_3}\right) \end{vmatrix} +$$

$$-R_s \begin{vmatrix} R_s & V_1 & \left(-j\frac{1}{\omega_0 C_3}\right) \\ R_3 & 0 & \left(-R_3 + j\frac{1}{\omega_0 C_2}\right) \\ 0 & 0 & \left(R_2 - j\frac{1}{\omega_0 C_3}\right) \end{vmatrix} +$$

$$+R_3 \begin{vmatrix} R_s & V_1 & \left(-R_s - R_1 + j\frac{1}{\omega_0 C_3}\right) \\ R_3 & 0 & 0 \\ 0 & 0 & \left(j\frac{1}{\omega_0 C_3}\right) \end{vmatrix} = 0$$

Multiplying, $$\left(R_s + R_3 - j\frac{1}{\omega_0 C_1}\right)\left(j\frac{V_1 R_3}{\omega_0 C_3} + \frac{V_1}{\omega_0^2 C_2 C_3}\right) - V_1\left(\frac{R_3}{\omega_0^2 C_3^2}\right)$$

$$+ V_1 R_3\left(R_2 - j\frac{1}{\omega_0 C_3}\right)\left(-R_s - R_1 + j\frac{1}{\omega_0 C_3}\right)$$

$$+ V_1 R_s\left(j\frac{1}{\omega_0 C_3}\right)\left(-R_3 + j\frac{1}{\omega_0 C_2}\right)$$

$$+ V_1 R_s R_3\left(R_2 - j\frac{1}{\omega_0 C_3}\right) - R_3^2 V_1\left(j\frac{1}{\omega_0 C_3}\right) = 0$$

After cancelling all equal and opposite terms, $$+\frac{V_1 R_3}{\omega_0^2 C_2 C_3} + \frac{V_1 R_3}{\omega_0^2 C_1 C_3} - j\frac{V_1}{\omega_0^3 C_1 C_2 C_3} - V_1 R_3 R_2 R_1$$

$$+ j\frac{V_1 R_3 R_2}{\omega_0 C_3} + j\frac{V_1 R_3 R_1}{\omega_0 C_3} = 0$$

Equating the *real* terms $$\frac{V_1 R_3}{\omega_0^2 C_3}\left[\frac{1}{C_2} + \frac{1}{C_1}\right] - V_1 R_3 R_2 R_1 = 0$$

or $$R_1 R_2 = \frac{C_1 + C_2}{\omega_0^2 C_1 C_2 C_3} \qquad (1)$$

which is one of the equalities to be demonstrated. Now, equating the *imaginary* terms $$-j\frac{V_1}{\omega_0^3 C_3 C_1 C_2} + j\frac{V_1 R_2 R_3}{\omega_0 C_3} + j\frac{V_1 R_1 R_3}{\omega_0 C_3} = 0$$

From this $$\frac{1}{\omega_0^2 C_1 C_2} = R_2 R_3 + R_1 R_3$$

and $$R_3 = \frac{1}{\omega_0^2 C_1 C_2 (R_1 + R_2)} \qquad (2)$$

which is the remaining equality to be demonstrated.

In one particular application of the invention, it was found desirable to vary the "notch" frequency between 12.75 c.p.s. and 18.25 c.p.s. To bring this about, the following component values were found to be satisfactory in the circuit of FIG. 1:

$C = .047\ \mu f.$
$C_3 = .033\ \mu f.$
$C_4 = 0$
$R_4 = R_5 = 520K$
$R_6 = 147K$
$270K < R_1 = R_2 < 520K$
$47K < R_3 < 147K$

Since the minimum value utilized for each of $R_1$ and $R_2$ was 270K, and the minimum value employed for $R_3$ was 47K, it may in some cases be desirable to substitute fixed resistors for these particular portions of the respective potentiometers to improve circuit stability and to permit more accurate adjustment of the movable contact elements.

Obviously many modifications and variations of the present invention are possible in the light of the above teachings. It is therefore to be understood that within the scope of the appended claims the invention may be practiced otherwise than as specifically described.

I claim:

1. A frequency-selective attenuating network of the twin-type comprising input and output terminals, first and second potentiometers having resistance elements the respective ends of which are connected in series between the input and output terminals of said network, a first fixed capacitor connected between a point of constant potential and the interconnected ends of the first and second potentiometer resistance elements, a third potentiometer the resistance element of which has one end connected to the said constant potential point, second and third fixed capacitors respectively connected between the movable contacts of said first and second potentiometers and the remaining end of the third potentiometer resistance element, and a connection between the movable contact of said third potentiometer and said point of constant potential, the movable contacts of said first and second potentiometers being ganged together to permit concurrent manual actuation thereof, whereby the attenuation characteristic of said network at any particular frequency within its operating range may be varied by manual actuation of said ganged potentiometer contacts without changing the D.-C. resistance appearing between the said network input and output terminals.

2. An attenuating network in accordance with claim 1, in which said third potentiometer is ganged to said first and second potentiometers to permit concurrent manual actuation thereof.

3. An attenuating network in accordance with claim 1, further comprising a fourth capacitor connected between the input and output terminals of said network and bridging the series-connected resistance elements of said first and second potentiometers.

4. A constant-resistance attenuating network having a "null" frequency variable over a limited range, said network being of the twin-type and composed of first and second series-related resistance elements connected between the input and output terminals of the network, a first and second shunt capacitors respectively connected to intermediate points on the two series-related resistance elements, each of said first and second shunt capacitors also being connected through a third resistance element to a point of constant potential, a third shunt capacitor connected between the said point of constant potential and a point between the said first and second resistance elements, the circuit values of each component being so chosen that $$R_1 R_2 = \frac{C_1 + C_2}{\omega_0^2 C_1 C_2 C_3} \qquad (1)$$

and $$R_3 = \frac{1}{C_1 C_2 (R_1 + R_2) \omega_0^2} \qquad (2)$$

where $R_1$ = that portion of said first resistance element lying between the intermediate point thereon to which said first capacitor is connected and the end of the resistance element removed from the input terminal of said network $R_2$ = that portion of said second resistance element lying between the intermediate point thereon to which said second capacitor is connected and the end of the resistance element removed from the output terminal of said network $R_3$ = said third resistance element $C$ = each of said first and second shunt capacitors $C_3$ = said third shunt capacitor, the resistance values being expressed in ohms and the capacitance values in microfarads.

5. An attenuating network in accordance with claim 4, in which each of said resistance elements is in the form of a potentiometer, the movable contacts of said first and second elements being respectively connected to said first and second shunt capacitors, and the movable contact of said third element being connected to said point of constant potential.

6. The combination of claim 5, in which the movable contacts of all of said resistance elements are ganged together to permit concurrent manual actuation thereof.

References Cited in the file of this patent

UNITED STATES PATENTS

| | | |
|---|---|---|
| 2,218,400 | Le Bel | Oct. 15, 1940 |
| 2,372,419 | Ford et al. | Mar. 27, 1945 |
| 2,579,069 | Gardner | Dec. 18, 1951 |
| 2,655,627 | McWade | Oct. 13, 1953 |